United States Patent [19]

Alden et al.

[11] 4,131,901

[45] Dec. 26, 1978

[54] COVER MOUNTED HOLDDOWN FOR FACSIMILE RECORDER CASSETTE

[75] Inventors: John M. Alden, Needham; George C. Williams, South Easton, both of Mass.

[73] Assignee: Alden Research Foundation, Westboro, Mass.

[21] Appl. No.: 775,891

[22] Filed: Mar. 9, 1977

[51] Int. Cl.² .................. G03G 17/00; G03G 17/02
[52] U.S. Cl. ............................... 346/165; 346/145
[58] Field of Search ............... 346/165, 145; 360/96, 360/93; 358/300

[56] References Cited

U.S. PATENT DOCUMENTS

| | | | |
|---|---|---|---|
| 3,545,004 | 12/1970 | Alden | 346/165 |
| 3,761,952 | 9/1973 | Simpkins | 346/165 |
| 3,867,722 | 2/1975 | Syohji | 360/96 |
| 3,877,075 | 4/1975 | Watanabe | 360/96 |

Primary Examiner—Jay P. Lucas
Attorney, Agent, or Firm—Grover and Meegan

[57] ABSTRACT

In a facsimile recorder receiving a cassette holding a supply of recording paper and having a linear recording electrode, the recorder has a frame detachably receiving the cassette. A scanning electrode on the frame cooperates with the linear electrode on the cassette to mark the recording paper with electrical signals applied to the electrodes as the paper is drawn from the cassette. A cover hinged to the frame carries a resilient member engaging the cassette to urge the linear electrode toward the path of the recording paper and scanning electrode thereby insuring good recording contact with the paper.

13 Claims, 5 Drawing Figures

COVER MOUNTED HOLDDOWN FOR FACSIMILE RECORDER CASSETTE

BACKGROUND OF THE INVENTION

As shown in U.S. Pat. No. 3,890,622 which is incorporated herein by reference some modern facsimile recorders operate with detachable cassettes holding a supply of electrolytic recording paper web, for example, and also mounting a linear recording electrode which opposes a scanning electrode on the recorder frame. The scanning and linear electrodes cooperate to mark graphic signals on the recording web drawn from the cassette between the electrodes. In such cassette recorders there is a problem of holding the independently cassette-mounted linear electrode in yielding recording contact with the paper on the recorder frame.

It is the object of this invention to improve the way in which the linear electrode is held in recording position.

STATEMENT OF INVENTION

According to the invention a graphic recorder of electrical signals on a moving recording web drawn from a detachable cassette past a linear recording electrode on the cassette comprises a frame detachably receiving the cassette with its linear electrode adjacent a recording zone transverse of the web path, scanning electrode means on the frame cooperative with the linear electrode to apply electrical marking signals to the web, and means attached moveably to the frame carrying a resilient member for engaging the cassette and yieldingly urging the linear electrode toward the web path to insure contact of the linear electrode across the web.

DRAWINGS

DESCRIPTION

Figure 2:
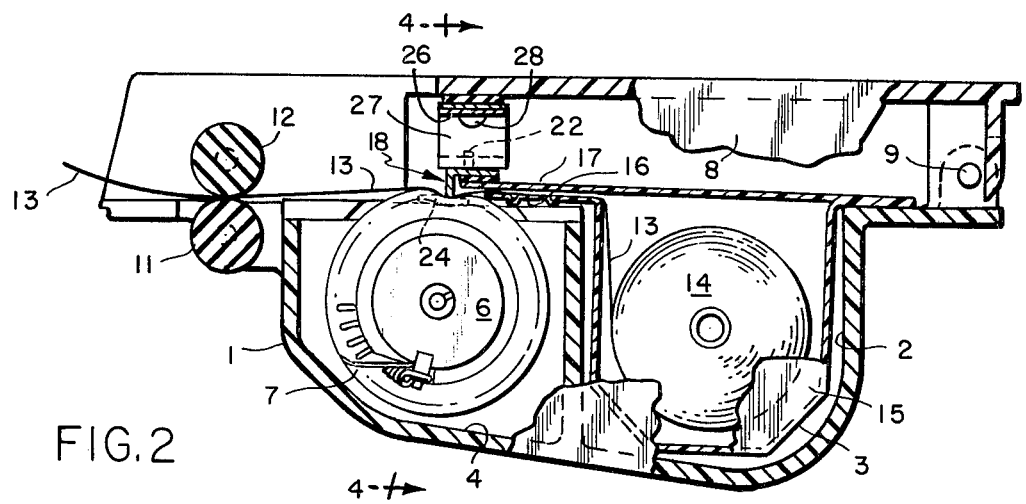
FIG. 2 is an enlarged side elevation of the recorder of FIG. 1.
Figure 1:
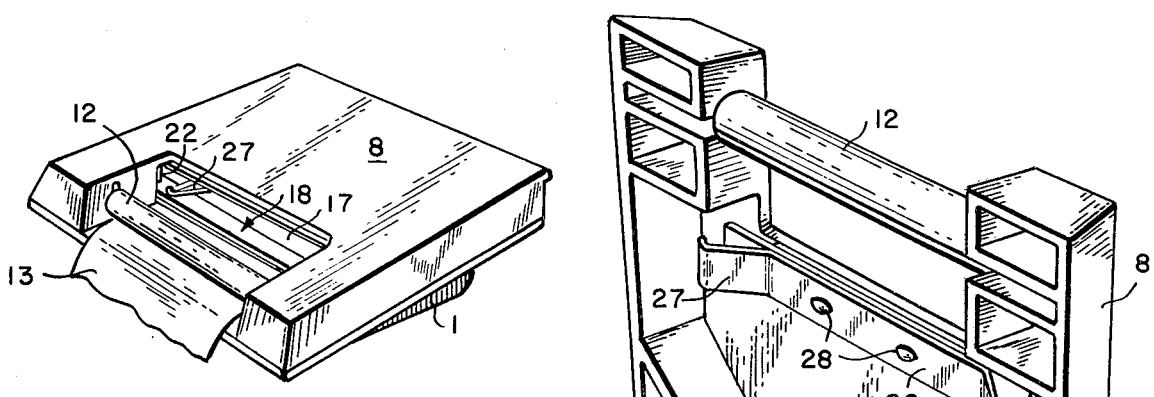
FIG. 1 is an isometric view of one form facsimile recorder according to the invention.
Figure 3:
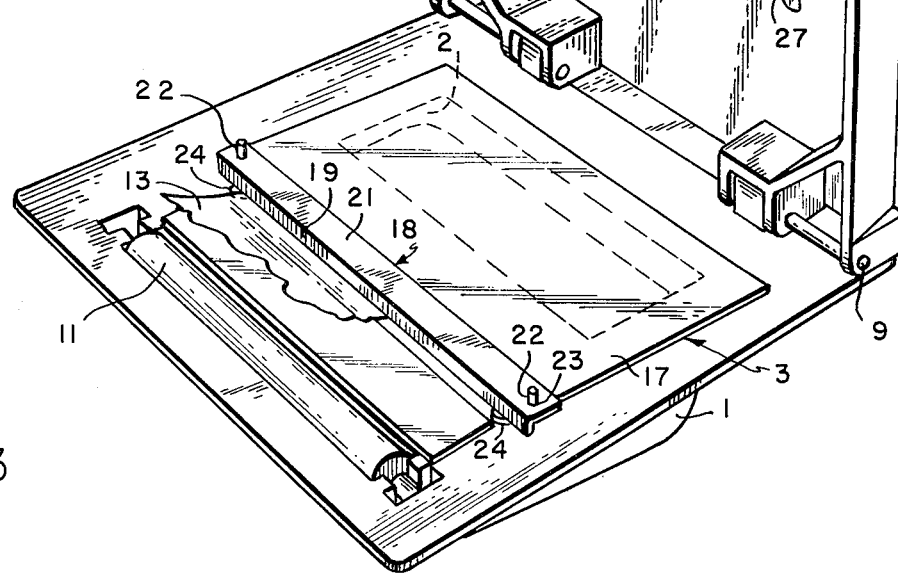
FIG. 3 is an enlarged isometric view of the recorder with its cover opened.
Figure 4:
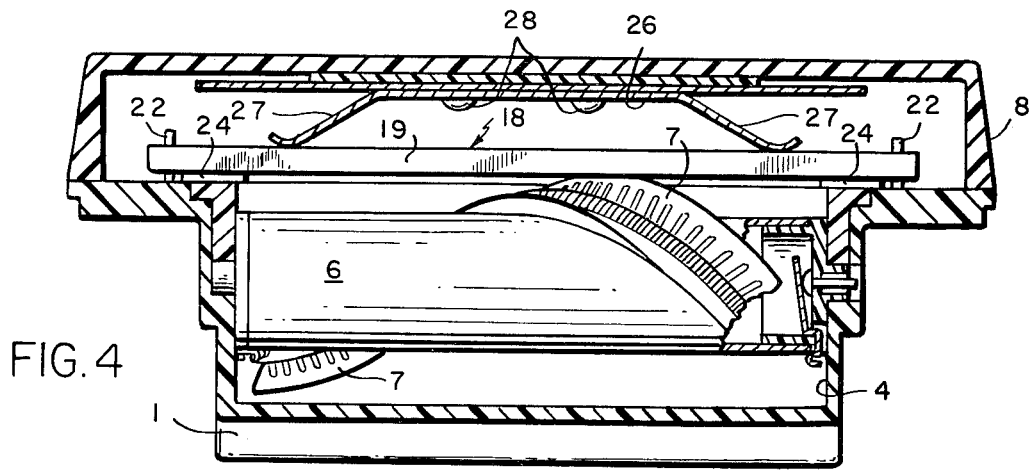
FIG. 4 is a section on line 4—4 of FIG. 1.

As shown in FIGS. 1 to 4 one form of facsimile recorder according to the present invention comprises a base frame 1 forming a first compartment 2 receiving a cassette 3 and a second compartment 4 in which is journalled a drum 6 having a helical scanning electrode 7 curved around its periphery as shown most clearly in FIG. 4. A cover 8 is hinged to the base frame 1 at a pivot 9. A motor driven feed roller 11 on the base and opposed by an idler roll 12 on the cover draws a moist electrolytic recording web 13 from a supply roll 14 within the cassette 3.

The cassette 3 described more fully in copending U.S. Pat. application of Jeffrey B. Kurland et al., Ser. No. 783,042 entitled STIFFENING CONSTRUCTION FOR FACSIMILE CASSETTE, filed Mar. 30, 1977, comprises an angularly cylindrical housing 15 from which the leading end 13 of the recording web is drawn on a path through a cassette exit formed by a lower lip 16 and an upper lip 17. Attached at the end of the upper lip 17 is a linear electrode 18 of L-shaped cross section (FIG. 3) with a short leg 19 and a long let 21. The leg 19 forms a linear recording edge in opposition to the scanning helical electrode 7. The linear and scanning electrodes cooperate to mark the electrolytic paper web 13 on the path between them when electrical signals are applied to the two electrodes. Signals are supplied to the linear electrode 18 through register pins 22 which fit through perforations 23 in each end of the linear electrode and position the linear electrode with respect to the helocal scanning electrode 7. Pads 24 on the base frame at each end of the linear electrode limit vertical positioning of the linear electrode.

According to the present invention firm contact of the linear electrode 18 with the register pins or like register means and steady positioning of the cassette blade with respect to the path pads 24 and helical electrode 7 are assured by providing a holddown 26 on the cover 8. The holddown includes a resilient member 27, for example, a yielding leaf spring of thin stainless steel or beryllium copper formed at each end of the holddown. The holddown is secured at its mid part to the cover 8 by fasteners 28 leaving its ends free to yieldingly urge the linear electrode 18 firmly registered on the pins 22 and toward the path of the paper web 13 and the opposed scanning electrode 7 as shown particularly in FIGS. 1 and 4. Good contact of the blade across the paper web is thereby insured. The straightness of the contact can be further insured by bowing the linear electrode 18 slightly upwardly between the pads 24 so that the force of the holddown member tends to eliminate the bowing and cause the linear electrode to present a straight edge to the recording web unbowed by the holddown force.

Figure 5:
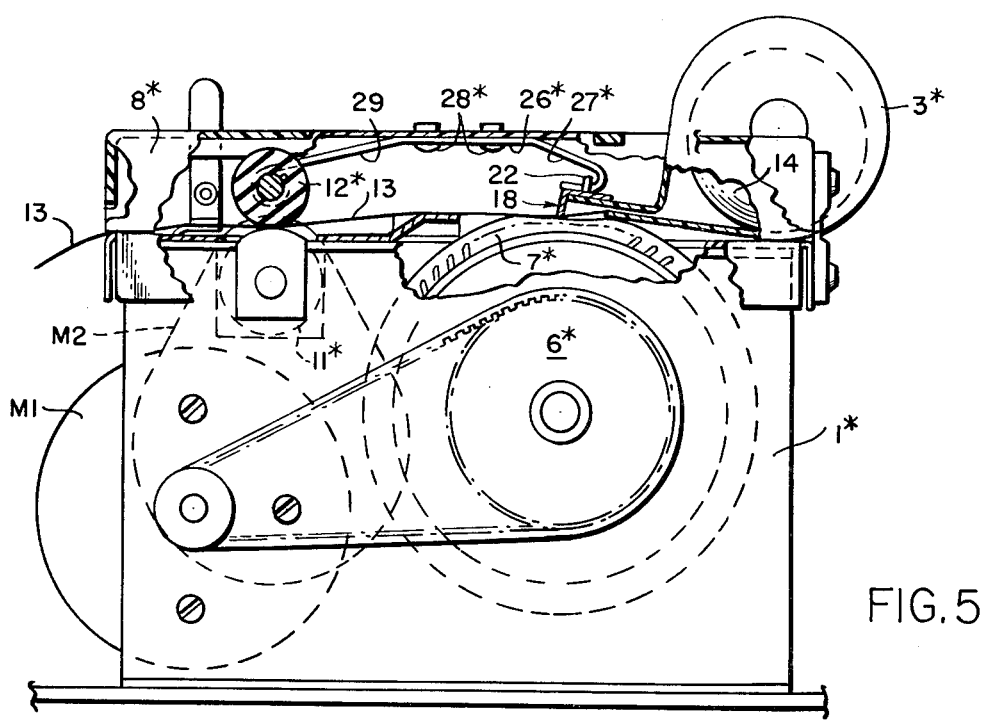
FIG. 5 is an elevation like FIG. 2 of another form of the recorder.

A somewhat different form of facsimile recorder shown in FIG. 5 has a base frame 1* and a partial cover 8*. On the base frame are a drum 6* carrying a helical scanning electrode 7* and driven by a motor M1. A feed roller 11* driven by a motor M2 cooperates with an idler roller 12* on the partial cover 8* to draw the leading end 13 of a recording web from a supply roll 14 in a cassette 3* registered by pins 22 on a top plane of the base frame 1*. The cassette carries a linear electrode 18 like that in FIGS. 1 to 4. In this recorder a modified holddown 26* includes a first resilient member 27* which extends rearwardly and downwardly of the cover engaging the linear electrode 18 over a substantial part of its length between the register pins 22. The holddown also includes a second resilient member 29 extending forwardly to the idler roller 12*. The single holddown thus insures good web contact by both the cassette blade and idler roller despite misalignment of the cover or cassette.

It should be understood that the present disclosure is for the purpose of illustration only and that this invention includes all modifications and equivalents which fall within the scope of the appended claims.

We claim:

1. A graphic recorder of electrical signals on a moving recording web drawn on a path from a detachable cassette past a linear recording electrode disposed on the cassette comprising:

a frame detachably receiving the cassette with its linear electrode adjacent a recording zone transverse of the web path, scanning electrode means on the frame cooperative with the linear electrode to apply electrical marking signals to the web, and means attached moveably to the frame carrying a resilient member for engaging the cassette and yieldingly urging the linear electrode toward the web path to insure contact of the linear electrode across the web.

2. A recorder according to claim 1 including positioning means engaging the cassette, wherein the resilient member urges the cassette against the positioning means.

3. A recorder according to claim 2 wherein the positioning means engages the cassette electrode.

4. A recorder according to claim 1 wherein the moveably attached means comprises a cover hinged to the frame.

5. A recorder according to claim 4 wherein the resilient member comprises a leaf spring mounted on the cover and extending toward the recording zone.

6. A recorder according to claim 5 wherein a two ended leaf spring engages the cassette at one end and carries a roller at its other end for engaging the recording web, the frame including an opposed roller for driving the web in cooperation with the spring carried roller.

7. A recorder according to claim 1 including feed means for drawing the web from the recorder, comprising a feed member mounted on the resilient means.

8. A recorder according to claim 7 wherein the feed means comprises a driven roller and the feed member comprises an opposed idler roller.

9. A recorder according to claim 1 in combination with cassette having a linear recording electrode thereon, wherein the linear electrode has a preformed bowing toward the resilient member, the resilient member tending to substantially eliminate the bowing so that the linear electrode presents a straight edge to the recording web.

10. A graphic recorder of electrical signals on a moving recording web drawn on a path from a supply past a linear recording electrode in a recording zone comprising:
a frame with means for receiving the supply and means for detachably receiving the linear electrode adjacent said recording zone and transversely of the web path; a cover hinged to said frame;
scanning electrode means on the frame cooperative with the linear electrode to apply electrical marking signals to the web; and
a resilient member separate from the linear electrode, and attached to the cover for yieldingly urging the linear electrode on the means for receiving the electrode toward the web path to insure contact of the linear electrode across the web.

11. The graphic recorder according to claim 10 wherein the linear electrode is an L shaped member having one leg disposed transverse the web path and the other leg cooperatively arranged with said means for detachably receiving the linear electrode.

12. The graphic recorder according to claim 10 including a detachable cassette holding the supply of recording web, said cassette having an exit formed of an upper and lower lip from which the recording web emerges, said linear recording electrode being disposed on the upper lip and cooperatively associated with said means for detachably receiving the linear electrode, said member being arranged to urge said cassette towards the web path.

13. The graphic recorder according to claim 12 wherein said member yieldingly engages the linear electrode.

* * * * *